US011829777B2

United States Patent
Zhou et al.

(10) Patent No.: US 11,829,777 B2
(45) Date of Patent: Nov. 28, 2023

(54) MICROSERVICE DEPLOYMENT

(71) Applicant: International Business Machines Corporation, Armonk, NY (US)

(72) Inventors: Kaihua Zhou, Toronto (CA); Kangda Zhang, Kleinburg (CA); Alexander Abrashkevich, Richmond Hill (CA); Mengdie Chu, Toronto (CA); Sen Yang, Scarborough (CA); Sriram Srinivasan, San Jose, CA (US); Simon Shi, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 17/083,210

(22) Filed: Oct. 28, 2020

(65) Prior Publication Data
US 2022/0129284 A1    Apr. 28, 2022

(51) Int. Cl.
G06F 9/445 (2018.01)
G06F 8/71 (2018.01)
G06F 9/50 (2006.01)
G06F 8/61 (2018.01)
G06F 9/54 (2006.01)

(52) U.S. Cl.
CPC ............ *G06F 9/44505* (2013.01); *G06F 8/61* (2013.01); *G06F 8/71* (2013.01); *G06F 9/5077* (2013.01); *G06F 9/547* (2013.01); G06F 2209/505 (2013.01)

(58) Field of Classification Search
CPC .................................................. G06F 9/44505
See application file for complete search history.

(56) References Cited

U.S. PATENT DOCUMENTS

| 6,381,742 | B2 | 4/2002 | Forbes et al. |
| 10,628,290 | B2 | 4/2020 | Modeel |
| 11,422,844 | B1* | 8/2022 | Filiz ................... G06F 9/45558 |
| 2005/0091346 | A1* | 4/2005 | Krishnaswami ...... H04L 63/101 719/310 |
| 2013/0227563 | A1* | 8/2013 | McGrath .................. G06F 8/60 718/1 |
| 2017/0257424 | A1* | 9/2017 | Neogi ..................... H04L 67/10 |
| 2020/0142675 | A1 | 5/2020 | Jaeger et al. |
| 2020/0244638 | A1 | 7/2020 | Gupta et al. |

(Continued)

OTHER PUBLICATIONS

Chandramouli, "Security Strategies for Microservices-based Application Systems," National Institute of Standards and Technology, U.S. Department of Commerce, NIST Special Publication 800-204, Aug. 2019, 50 pages.

(Continued)

*Primary Examiner* — Wynuel S Aquino
(74) *Attorney, Agent, or Firm* — Yee & Associates, P.C.

(57) ABSTRACT

A method manages microservices. A number of processors identifies configuration information for a set of assemblies. The number of processors configures a set of namespaces in a computer system for the set of assemblies using a first set of permissions needed to set up the set of namespaces using the configuration information. The number of processors installs the set of assemblies using a second set of permissions using the configuration information. The second set of permissions has a lower level than the first set of permissions.

14 Claims, 10 Drawing Sheets

(56) References Cited

U.S. PATENT DOCUMENTS

2021/0365272 A1* 11/2021 Mansour .................. G06F 8/60
2021/0365577 A1* 11/2021 Acharya ............... G06F 21/629
2022/0012080 A1* 1/2022 Shepherd ............ G06F 9/45558

OTHER PUBLICATIONS

Mell et al., "The NIST Definition of Cloud Computing," National Institute of Standards and Technology, U.S. Department of Commerce, NIST Special Publication 800-145, Sep. 2011, 7 pages.

* cited by examiner

MICROSERVICE DEPLOYMENT

BACKGROUND

1. Field

The disclosure relates generally to an improved computer system and, more specifically, to a method, apparatus, computer system, and computer program product for deploying microservices.

2. Description of the Related Art

Microservices are a software architecture style in which applications are comprised of small independent components that communicate with each other. This communication can be performed using application programming interface (API) contracts. An API contract is a shared understanding of what capabilities an API interface has and enables applications to be programmed to use this interface.

An application can be formed from a collection of microservices in contrast to a monolithic application built as a single component. Each of these microservices are components that run their own processes and can be connected to other microservices. The functionality of the application can be divided up across these microservices. For example, each function for an application can be implemented in a microservice.

When changes are desired to a traditional monolithic application, changes to a function within this type of application require revising and redeploying this application. This type of revision and redeployment is required even when a change is made to explore part of the application. In contrast, with an application comprised of microservices, a change to one of the functions can be distributed by deploying the microservice in which the changes occur without redeploying an entire package of microservices.

SUMMARY

According to one embodiment of the present invention, a method for managing microservices is provided. A number of processors identifies configuration information for a set of assemblies. The number of processors configures a set of namespaces in a computer system for the set of assemblies using a first set of permissions needed to set up the set of namespaces using the configuration information. The number of processors installs the set of assemblies using a second set of permissions using the configuration information. The second set of permissions has a lower level than the first set of permissions.

According to another embodiment of the present invention, a microservice management system comprises a computer system that identifies configuration information for a set of assemblies. The computer system configures a set of namespaces in the computer system for the set of assemblies using a first set of permissions needed to set up the set of namespaces using the configuration information. The computer system installs the set of assemblies using a second set of permissions using the configuration information, wherein the second set of permissions has a lower level than the first set of permissions.

According to yet another embodiment of the present invention, a computer program product for managing microservices comprises a computer-readable storage media with first program code, second program code, and third program code stored on the computer-readable storage media. The first program code is executable by a computer system to cause the computer system to identify configuration information for a set of assemblies. The second program code is executable by the computer system to cause the computer system to configure a set of namespaces in a computer system for the set of assemblies using a first set of permissions needed to set up the set of namespaces using the configuration information. The third program code is executable by the computer system to cause the computer system to install the set of assemblies using a second set of permissions using the configuration information, wherein the second set of permissions has a lower level than the first set of permissions.

DETAILED DESCRIPTION

Figure 1:
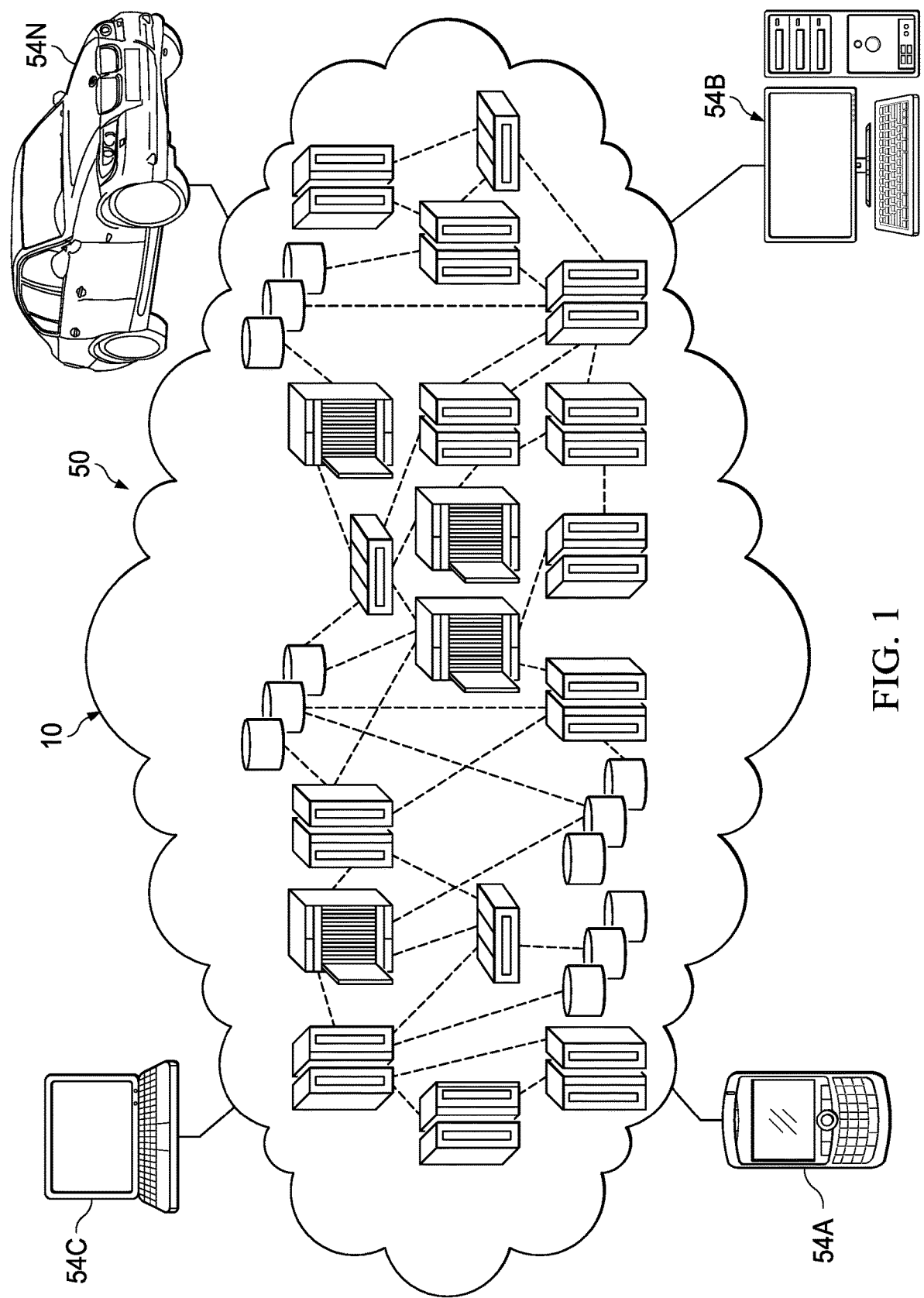
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that a different set of challenges is present with a microservices architecture. The illustrative embodiments recognize and take into account that the deployment of a complex software using microservices can be difficult, especially when flexibility is required and numerous microservices are deployed in varying configurations. For example, the illustrative embodiments recognize and take into account that a user may want to selectively deploy microservices into multiple namespaces or install multiple instances of a microservice of different versions in a single namespace.

The illustrative embodiments recognize and take into account that current techniques bundle microservices including images and files into a single archive file often referred to as a 'tarball' for distribution. This archive file can be unpacked and installed using a script. The illustrative embodiments recognize and take into account that with current techniques, the archive file for a product can become much larger than desired. For example, the illustrative embodiments recognize and take into account that an archive file can have a size of 20 gigabytes or greater with seven base microservices. The illustrative embodiments recognize and take into account that these microservices are installed together and cannot be selectively installed in which some microservices are omitted. The illustrative embodiment recognize and take into account that if a user desires to have a custom build to install a subset of the microservices, this type of install requires working with customer support and can be a costly process.

The illustrative embodiments recognize and take into account that upgrading individual microservices can be problematic because of inter-dependencies and requirements to support different versions for different services. Further, the illustrative embodiments recognize and take into account that support for a private or hybrid cloud can be more difficult to access if the Internet is unavailable. The illustrative embodiments recognize and take into account that files and Docker images are handled differently when an Internet connection is available as compared to other installations that have access to an Internet connection. The illustrative embodiments recognize and take into account that these issues can also arise when upgrading, scaling, and patching these interdependent microservices without an Internet connection. The illustrative embodiments recognize and take into account that the complexity of deployed microservices makes it difficult to fix various issues that might arise in areas of networking, storage, memory, or other areas.

Thus, the illustrative embodiments provide a method, apparatus, system, and computer program product for managing microservices. In one illustrative example, configuration information is identified for a set of assemblies. A set of namespaces is configured in a computer system for the set of assemblies using a first set of permissions needed to set up the set of namespaces using the configuration information. The set of assemblies is installed using a second set of permissions and using the configuration information, wherein the second set of permissions has a lower level than the first set of permissions.

As used herein, a "set of," when used with reference to items, means one or more items. For example, a "set of namespaces" is one or more namespaces.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 in cloud computing environment 50 can communicate with any type of computerized device over any type of network and/or network addressable connection (e.g., using a web browser).

Figure 2:
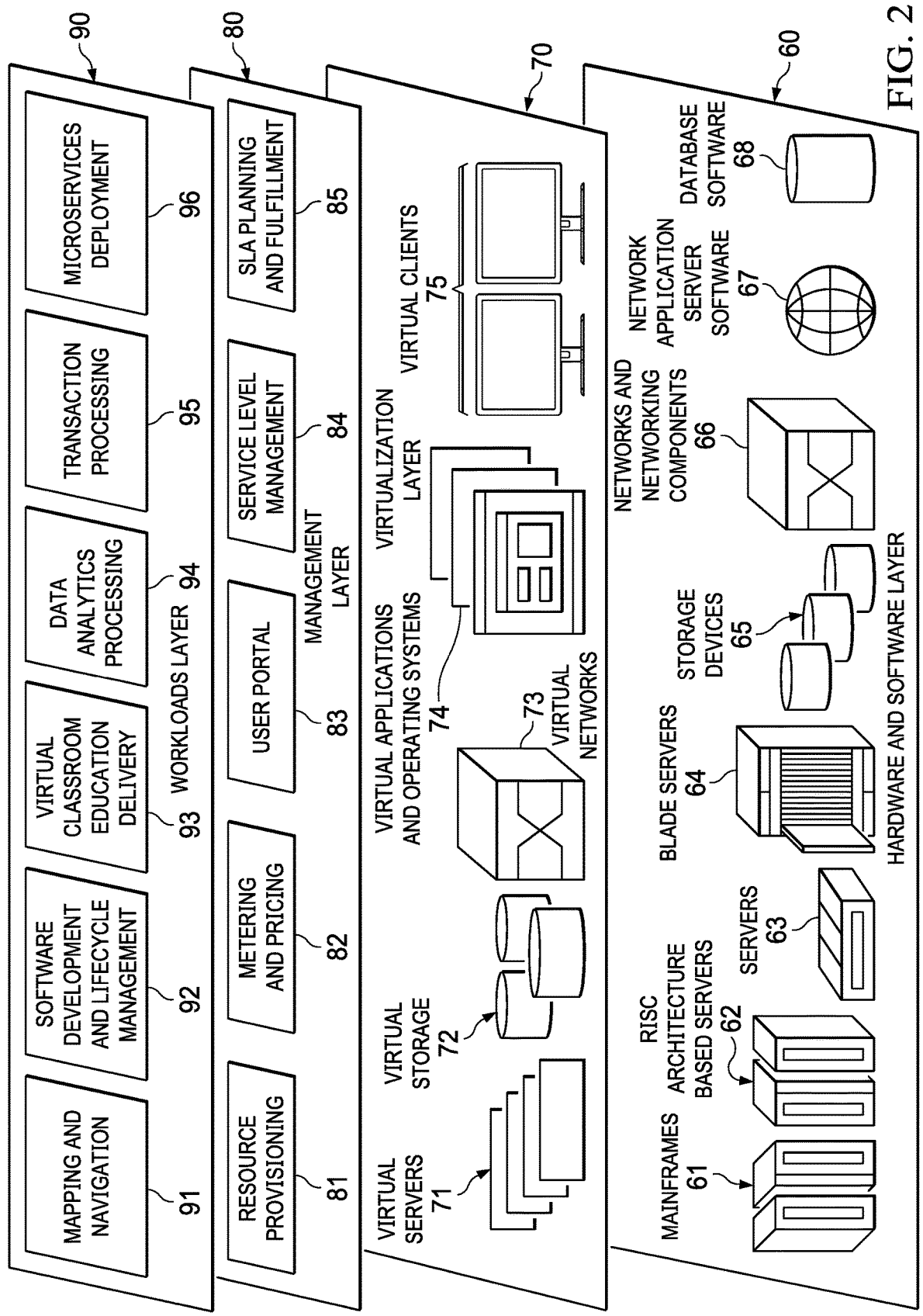
FIG. 2 is a set of functional abstraction layers provided by the cloud computing environment in FIG. 1 in accordance with an illustrative embodiment.

Referring now to FIG. 2, a set of functional abstraction layers provided by cloud computing environment 50 in FIG. 1 is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservices deployment 96. Microservices deployment 96 provides a service for managing microservices in cloud computing environment 50 in FIG. 1 or a network in a physical location that accesses cloud computing environment 50 in FIG. 1. In the illustrative example, deployment of microservices using microservices deployment 96 can be performed with at least one of increase security or flexibility as compared to current deployment techniques.

With microservices deployment 96, microservices can be deployed in which different steps in the deployment of microservices can be performed using privileges that are appropriate for the particular step. For example, setting up the environment, such as namespaces, in a computer system for microservices can be performed by microservices deployment 96 with a higher level of privilege as compared to installing the microservices into the namespaces. In this illustrative example, microservices deployment 96 can adjust the privilege to a highest level needed for a particular step to reduce security concerns.

Further, microservices can be installed in multiple namespaces using multiple instances in which groups of microservices can be grouped together for assemblies taking into account dependencies and order of installation. Additionally, multiple versions of a microservice can be installed in a single namespace by microservices deployment 96 in the illustrative example.

Figure 3:
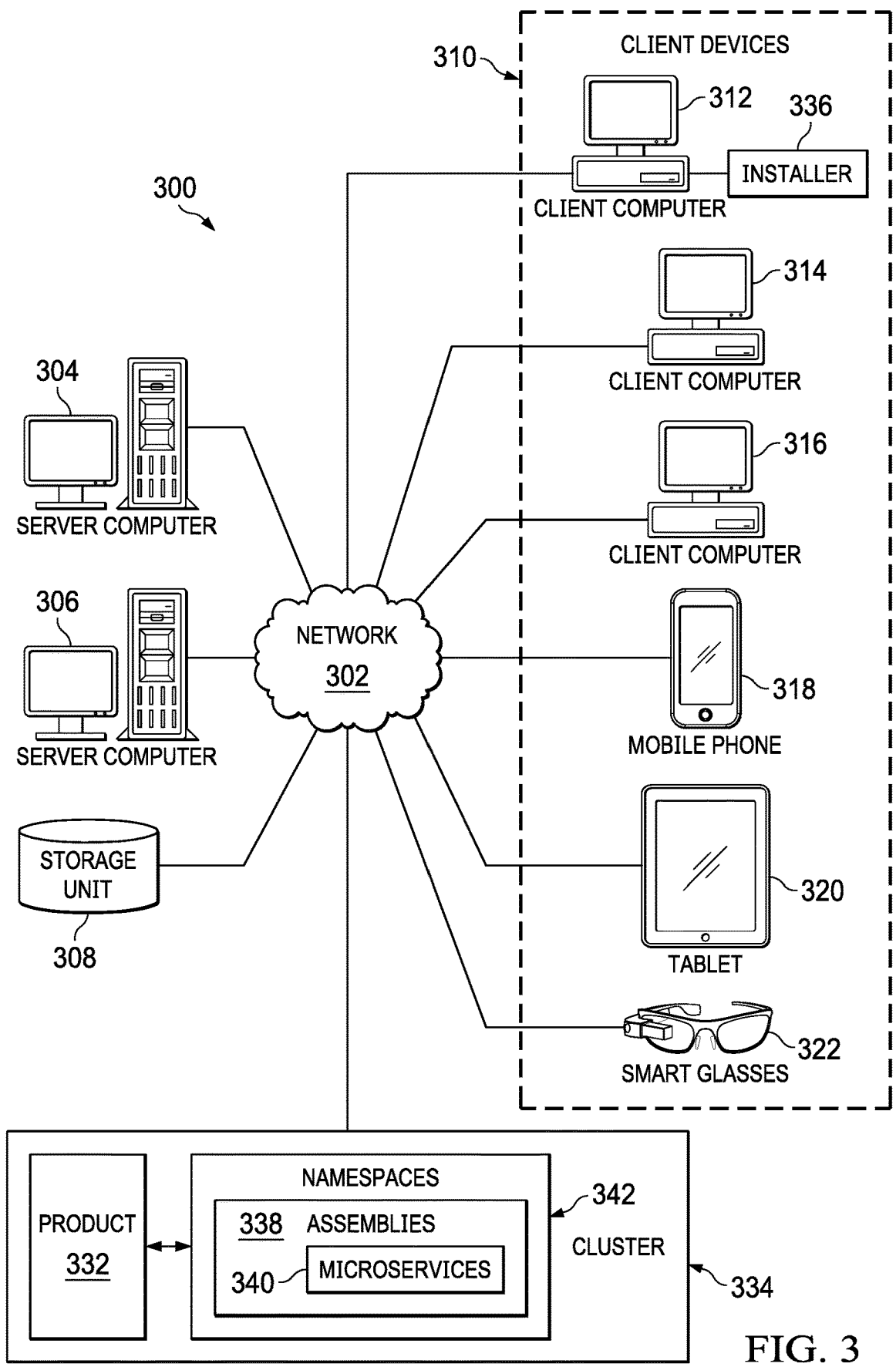
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Product 332 is an application that runs on cluster 334. In this illustrative example, product 332 can be, for example, a retail website, a web application, a chat service, a load balancer, an inventory service, a shipping service, a database, a financial transactions service, or other suitable types of products. Product 332 can provide services to users operating client devices 310. Cluster 334 is a set of computers and can be, for example, one or more server computers.

In this illustrative example, installer 336 is located in client computer 312. Installer 336 can operate to install product 332 in cluster 334. Installer 336 can operate from the locations such as in a computer in cluster 334, server computer 306, or some other suitable location.

In this illustrative example, product 332 is a microservices architecture. Product 332 is a set of assemblies 338 deployed in cluster 334. In this example, the set of assemblies 338 comprises microservices 340 for the set of assemblies 338. In this illustrative example, microservices 340 run in a set of namespaces 342 in cluster 334. In the illustrative example, a namespace in the set of namespaces 342 is a virtual environment in cluster 334. In other words, the set of namespaces 342 in cluster 334 is a set of multiple virtual clusters in which the hardware is cluster 334. Names of resources are unique within a namespace but not across namespaces 342 in these examples. In this manner, the resources in cluster 334 can be divided for use by multiple users.

In this illustrative example, the installation of the set of assemblies 338 can be performed in a manner that enhances security. In this illustrative example, installation of the set of assemblies 338 for product 332 can be performed using security settings with different levels of permissions. Changing the settings for the different levels of permissions can be performed in a manner that eliminates unnecessary elevation of permissions while installing assemblies 338.

In this illustrative example, a two persona procedure can be performed in which two levels of permissions are used to install assemblies 338 for product 332. For example, cluster admin level permissions are used to set up and configure the set of namespaces 342 in cluster 334 for installing the set of assemblies 338. These cluster admin level permissions enable installer 336 to perform the needed steps in cluster 334 to set up the environment for installing assemblies 338. In this illustrative example, the setting up of the environment involves setting up the set of namespaces 342. In some cases, the setting up of the environment can also include creating the set of namespaces 342 in cluster 334.

After the set of namespaces 342 is set up, the permissions can be lowered for installing the set of assemblies 338. In this illustrative example, microservices 340 are installed to form the set of assemblies 338. These installation steps can be performed with a lower level of permission. In this manner, security concerns can be reduced by using only privileges needed for particular steps in installing assemblies 338. Enhanced security can be achieved when deploying microservices 340 in the set of assemblies 338 for product 332.

Figure 4:
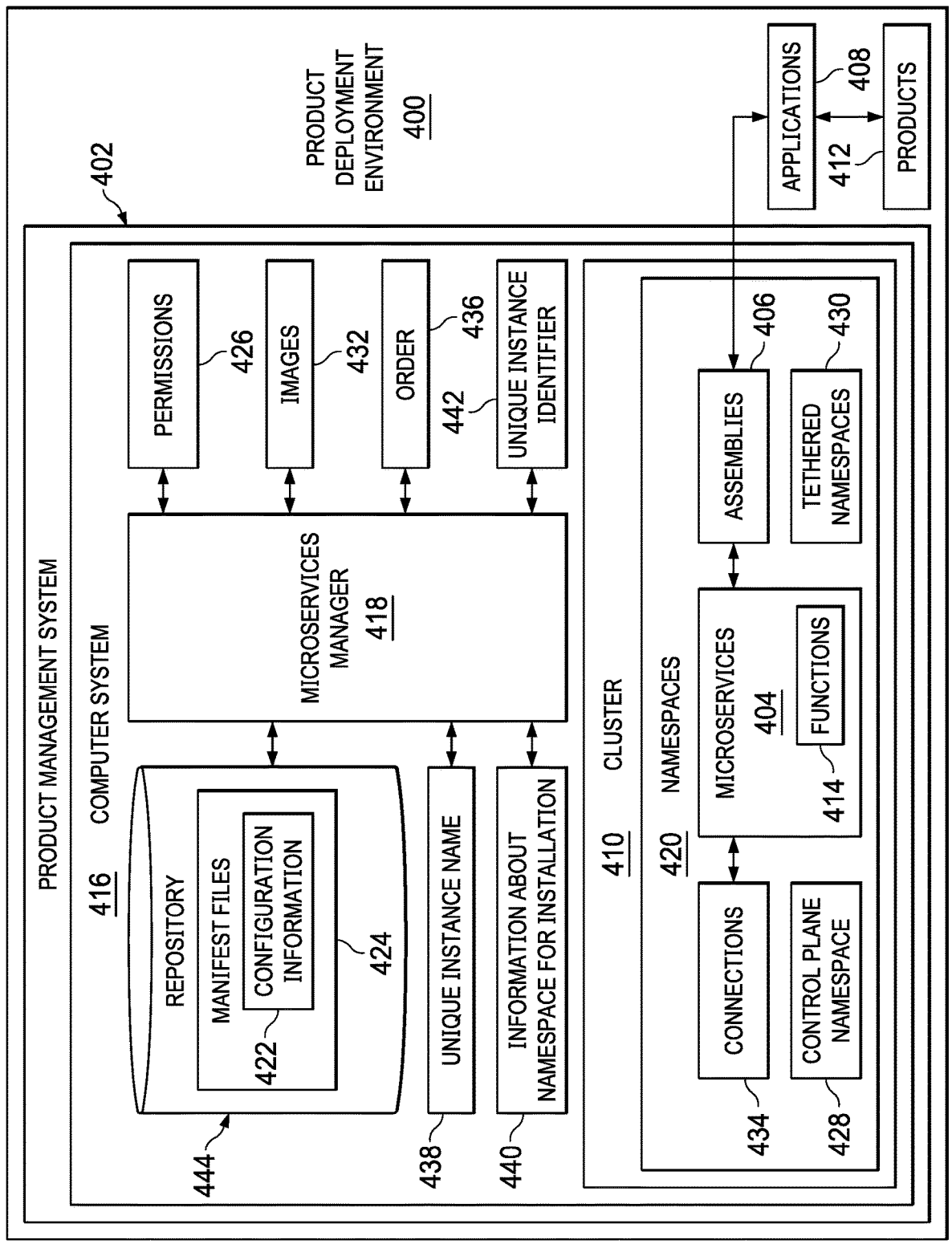
FIG. 4 is a block diagram of a microservice deployment environment in accordance with an illustrative embodiment.

With reference now to FIG. 4, a block diagram of a microservice deployment environment is depicted in accordance with an illustrative embodiment. In this illustrative example, product deployment environment 400 includes components that can be implemented in cloud computing nodes 10 in cloud computing environment 50 in FIG. 1, physical devices in hardware and software layer 60 in FIG. 2, and physical devices, such as cluster 334, server computer 304, server computer 306, and client devices 310 shown in network data processing system 300 in FIG. 3.

In this illustrative example, product management system 402 can be used to manage microservices 404. The management can include at least one of installing microservices 404, uninstalling microservices 404, updating microservices 404, or other suitable operations.

In this illustrative example, a set of assemblies 406 is comprised of microservices 404. As depicted, the set of assemblies 406 can correspond to a set of applications 408 deployed in cluster 410. In this illustrative example, cluster 410 is one or more computers. The set of applications 408 can be one or more of products 412 that are offered to users. Applications 408 can be installed by the users or can be offered as a service to the users.

In this illustrative example, microservices 404 can correspond to functions in assemblies 406. An assembly in the set of assemblies 406 can form an application in the set of applications 408 in which functions 414 for the application are provided by microservices 404. In some cases, an assembly may include one or more subassemblies to form the application.

In this illustrative example, product management system 402 comprises a number of different components. As depicted, product management system 402 comprises computer system 416 and microservices manager 418. In this illustrative example, cluster 410 is located inside of computer system 416. Cluster 410 can be computer system 416 or a portion of computer system 416. For example, cluster 410 can be one or more computers within computer system 416 that are designated for deployment of a set of applications 408 for one or more of products 412.

Microservices manager 418 can be implemented in software, hardware, firmware, or a combination thereof. When software is used, the operations performed by microservices manager 418 be implemented in program code configured to run on hardware, such as a processor unit. When firmware is used, the operations performed by microservices manager 418 can be implemented in program code and data and stored in persistent memory to run on a processor unit. When hardware is employed, the hardware may include circuits that operate to perform the operations in microservices manager 418.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 416 is physical hardware system and includes one or more data processing systems. When more than one data processing system is present in computer system 416, those data processing systems are in communication with each other using a communications medium. The communications medium can be a network. The data processing systems can be selected from at least one of a computer, a server computer, a tablet computer, or some other suitable data processing system.

In one illustrative example, microservices manager 418 can operate as an installer to deploy a set of assemblies 406 into cluster 410 for an application in the set of applications 408. The installation of the set of assemblies 406 involves installing microservices 404 into a set of namespaces 420 in cluster 410.

In installing the set of applications 408, microservices manager 418 identifies configuration information 422 for the set of assemblies 406. In this illustrative example, configuration information 422 can be stored or located in a set of manifest files 424. In this illustrative example, configuration information 422 can comprise at least one of a credential for downloading files and images, an entitled registry application programming interface (API) key, a metadata universal resource locator used to download data for assemblies, or other suitable information. The entitled registry application programming interface (API) key is a form of a password. The metadata universal resource locator (URL) can provide locations of servers with files and images for microservices in the set of assemblies 406. The credentials can be a username and password needed to obtain permission to download the files and images.

In this illustrative example, each assembly in the set of assemblies 406 can have a manifest file in the set of manifest files 424. The manifest file for an assembly lists microservices and any sub-assemblies that form the assembly. As a result, the appropriate manifest file in the set of manifest files 424 can be used based on the selection of the corresponding assembly in the set of assemblies 406 for installation. In the illustrative example, each microservice in microservices 404 can also have a manifest file in manifest files 424. A manifest file for a microservice can include, for example, a list of images and deployment rule files for the microservice.

In this illustrative example, microservices manager 418 configures a set of namespaces 420 in cluster 410 in computer system 416 for the set of assemblies 406 using a first set of permissions 426 needed to set up the set of namespaces 420 using configuration information 422. Microservices manager 418 installs the set of assemblies 406 using a second set of permissions 426 using configuration information 422. In this illustrative example, the second set of permissions 426 has a lower level than the first set of permissions 426. For example, the first set of permissions 426 can be administrative-level permissions for cluster 410. In this example, the second set of permissions 426 can be user-level permissions.

In configuring the set of namespaces 420, microservices manager 418 can, in some examples, create the set of namespaces 420 in cluster 410. In other illustrative examples, the set of namespaces 420 can already be present but configuration steps are performed for installing the set of microservices 404 for the set of assemblies 406.

In configuring the set of namespaces 420, microservices manager 418 can be performed using a number of different steps. For example, microservices manager 418 can configure the set of namespaces 420 by setting up control plane namespace 428 and a set of tethered namespaces 430. In configuring the set of namespaces 420, microservices manager 418 can establish access between control plane namespace 428 and the set of tethered namespaces 430. The access can be established by setting up rules, service accounts, will binding, or other mechanisms to set up access between these namespaces.

This access enables control plane namespace 428 to access the set of tethered namespaces 430. This access is used in this example to perform at least one of installing or managing microservices 404 in the set of tethered namespaces 430. For example, control plane namespace 428 can perform at least one of upgrading a micro service, patching a microservice, installing a microservice, or some other suitable step performed to install or manage a microservice in the set of tethered namespaces 430.

Microservices manager 418 can then install microservices 404 for a set of assemblies 406. In installing microservices 404 for the set of assemblies 406, microservices manager 418 performs a number of different steps. In this illustrative example, microservices manager 418 can download images 432 for microservices 404. In this illustrative example, images 432 are stored in repository 444 and not bundled into an archive file. As a result, only images needed for selected assemblies need to be downloaded from repository 444. As a result, the amount of data to be downloaded and installed can be reduced.

Further, images 432 can be selectively downloaded based on configuration information 422. As a result, different users can have different configuration information, which results in different images being downloaded for installing microservices 404. In this manner, custom installations can be generated by customizing configuration information 422. As a result, customized installs can be created more easily through customizing configuration information 422 as compared to generating a specialized archive as with current techniques.

In this illustrative example, an image in images 432 is a portion of a configured operating system with software and data. In other words, an image is a snapshot of the operating system that is ready to run for a microservice. Each image can be packaged or placed in a container for execution within cluster 410. Each microservice can have one or more containers in which each container runs an image.

In this illustrative example, a container is a standalone executable piece of software that includes everything needed to run the software including code, runtime, system tools, libraries, settings, and other information. A container isolates the software within the container from the environment outside of the container.

In the illustrative example, the container can be a Docker container, available from Docker, Inc. Docker is a platform as a service (PaaS) that is employed operating a system level virtualization for containers. These containers are isolated from other containers and include all of the information needed to operate. Communication is enabled with other containers and other applications for software outside of the container through well-defined channels such as application programming interfaces (APIs).

In this illustrative example, microservices manager 418 installs microservices 404 for the set of assemblies 406 in order 436 identified in configuration information 422 for the set of assemblies 406. The sequence of installation for microservices 404 can be important because of dependencies between microservices 404.

In this depicted example, order 436 can be stored for later use. Order 436 can be used to uninstall or upgrade microservices 404. For example, the order of installation can be used to uninstall microservices 404 in using order 436 until the microservice to be upgraded is reached. That microservice can then be removed and updated by installing a new microservice in its place. The other uninstalled microservices can then be reinstalled using order 436.

Additionally, configuration information 422 can be used to set up connections 434 between microservices 404 such that microservices 404 can interact or communicate with each other. In this illustrative example, application programming interfaces (APIs) are used to provide connections 434 for communication between microservices 404. In one illustrative example, a microservice in microservices 404 can be exposed to a user through routing and provide a user interface, such as a web page. Requests received from the user interface provided by this microservice can be redistributed to other microservices based on the API contracts between microservices 404. The response can be sent back to the user on the web page. These connections between microservices 404 can be preconfigured for an assembly through API contracts.

In the illustrative example, a set of assemblies 406 can be installed in control plane namespace 428 without using a set of tethered namespaces 430. In one illustrative example, multiple versions of an assembly may be installed in control plane namespace 428.

For example, microservices manager 418 can determine that an assembly in the set of assemblies 406 is to be installed multiple times as different versions in the same namespace, such as control plane namespace 428. This determination can be made by determining whether the assembly is reinstalled in cluster 410. Responsive to the assembly being already installed in cluster 410, microservices manager 418 can perform a new install of the assembly using unique instance name 438 within cluster 410 in which all components in the assembly are named in a similar manner. For example, the naming can be such that it can be determined that the new install is a version of the current installation of the assembly.

In another illustrative example, an assembly in the set of assemblies 406 can be installed multiple times in different namespaces. For example, an assembly can be installed multiple times in the set of tethered namespaces 430. For example, microservices manager 418 can rename microservices 404 for each instance of an assembly in the set of assemblies 406 using information about namespace for installation 440 and unique instance identifier 442.

In one illustrative example, one or more features are present that overcome a problem with installing products comprised of assemblies with microservices in a desired manner with desired levels of flexibility. As a result, one or more illustrative examples can increase flexibility of the installation process as compared to current techniques. In one illustrative example, deployment of multiple instances of a product can be placed into one or more tethered namespaces, thus allowing the multiple instances of the product to be installed. This installation can be performed for different groups or departments within an organization that use the same product. In this manner, multiple projects can be supported using instances of the same product. Additionally, isolation of the microservices in the tethered namespaces can be made to achieve enterprise-level collaboration for multiple teams and departments.

Further, one or more illustrative examples can provide enhanced security during installation of an assembly for a product. For example, a user and a cluster for administrator privileges can be implemented in a manner that reduces the use of elevated or higher level permissions to a minimum as needed for particular portions of the installation.

A number of processors in computer system 416 can be configured to perform at least one of the steps, operations, or actions described in the different illustrative examples using software, hardware, firmware, or a combination thereof. As a result, computer system 416 operates as a special purpose computer system in which microservices manager 418 in computer system 416 enables management in the deployment and security during the deployment of microservices 404 in cluster 410. In particular, microservices manager 418 transforms computer system 416 into a special purpose computer system as compared to currently available general computer systems that do not have microservices manager 418.

The illustration of product deployment environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, cluster 410 is shown to be part of computer system 416. In other illustrative examples, cluster 410 and computer system 416 can be separate components. Further, with respect to parameters for products 412, an installer provides a three-level override mechanism. Overrides could be applied on a microservice, an assembly level, or a global level. Module and assembly level overrides can be distributed by the product developers so that they can be changed from version-to-version. Global overrides can be defined at install time, usually with help from technical support to further customize the installation. Separate overrides can be supported for install and upgrade with an option for pre- and post-install and upgrade overrides. These overrides can be, for example, values for settings for microservices. The settings can be for at least one of storage settings, a local domain name service (DNS) route, a replica strategy, and other suitable settings.

Figure 5:
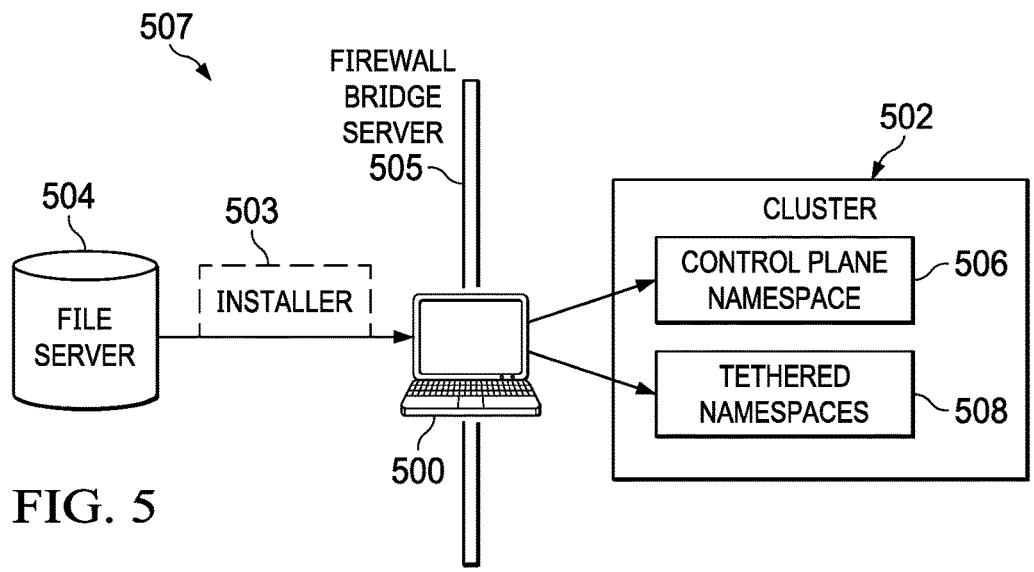
FIG. 5 is an illustration of a configuration of an environment for installing an assembly in accordance with an illustrative embodiment.

Turning next to FIG. 5, an illustration of a configuration of an environment for installing an assembly is depicted in accordance with an illustrative embodiment. In this illustrative example, computer 500 can perform steps to install a product in cluster 502. These steps are performed with computer 500 having a cluster admin role. Firewall bridge server 505 provides a firewall between cluster 502 and another network such as Internet 507.

In this illustrative example, a number of processors in computer 500 can perform steps in response to running program code to install a product. As used herein, a processor is comprised of hardware circuits such as those on an integrated circuit that respond and process instructions and program code that operate a computer. When a number of processors execute instructions for a process, the number of processors is one or more processors that can be on the same computer or on different computers. In other words, the process can be distributed between processors on the same or different computers in the computer system. Further, the number of processors can be of the same type or different types of processors. For example, a number of processors can be selected from at least one of a single core processor, a dual-core processor, a multi-processor core, a general-purpose central processing unit (CPU), a graphics processing unit (GPU), a digital signal processor (DSP), or some other type of processor.

In this illustrative example, computer 500 downloads installer 503 from file server 504. Computer 500 can then run installer 503 on computer 500 or copy and run installer 503 in cluster 502. By running installer 503, computer 500 can create control plane namespace 506 and tethered namespaces 508 within cluster 502. In some illustrative examples, the namespaces may already be present in cluster 502 and the creation of the namespaces may be unnecessary.

In this example, computer 500 can also download manifest files for privileges and cluster scope resources that are used to configure control plane namespace 506 and tethered namespaces 508. These resources can include, for example, a security context constraint (SCC), a custom resource definition (CRD), a role, a cluster role, and other information needed to set up the namespaces in cluster 502.

In this example, computer 500, running installer 503, can issue commands to cluster 502 to configure control plane namespace 506 and tethered namespaces 508. For example, computer 500 can request and apply resources in control plane namespace 506 and tethered namespaces 508. Further, computer 500 can set up namespace privileges in roles to allow control plane namespace 506 to access and manage microservices that may be installed in tethered namespaces 508.

Figure 6:
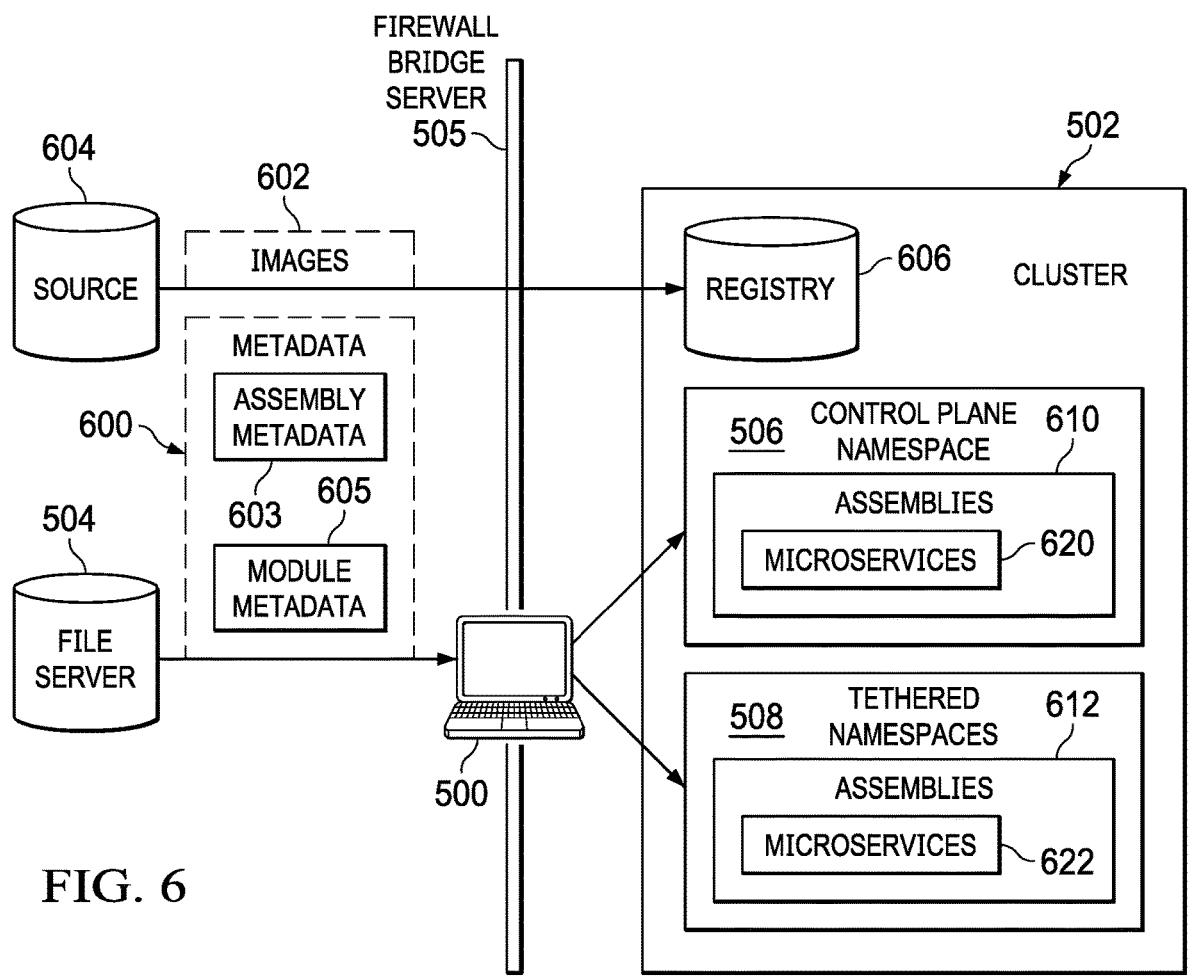
FIG. 6 is an illustration of a process for installing microservices in a cluster in accordance with an illustrative embodiment.

Turning now to FIG. 6, an illustration of a process for installing microservices in a cluster is depicted in accordance with an illustrative embodiment. In this figure, control plane namespace 506 and tethered namespaces 508 have been configured for installation of an assembly for a product.

In this phase of installation, metadata 600 is downloaded for use in installing microservices in control plane namespace 506 and tethered namespaces 508. In this illustrative example, metadata 600 includes assembly metadata 603 and module metadata 605. Assembly metadata 603 describes one or more assemblies including the microservices that form the assemblies. In this illustrative example, assembly metadata 603 can include a list of modules that will be used to install the microservices. Module metadata 605 is information about modules that describe images, files, and other information needed for the microservices. In other words, a module comprises information describing components and other information for a microservice. For example, a module can include a manifest file (that lists all other files and container images), a rule file (e.g. a helm chart file), override files, and other additional files (e.g., security patches).

With metadata 600, computer 500 can request images 602 to be copied from source 604 to registry 606 in cluster 502. Registry 606 is a local database for storing images 602. In this manner, images 602 can be accessed multiple times without needing access to images 602 stored in source 604.

In this illustrative example, the microservices can be installed using modules in module metadata 605. A single microservice can be installed using a module, where a collection of related modules can be installed to form the microservices for an assembly. In this example, a module defines components such as a set of images 602, files, metadata, configuration information, and other information that is used for the microservice. In other words, a module is a component that is used to install the microservice.

Each assembly can have a matching manifest file with configuration information. This configuration information includes a list of components in the assembly. An assembly can reference other assemblies as a dependency, which helps to define and manage complex dependency relations and hierarchies. For example, the configuration file can list modules, images 602, and files that are needed for microservices to be installed.

This configuration information can be in a separate manifest file or as part of the manifest file or the assembly. In this manner, user input can select a particular assembly or assemblies for installation, and an installer can identify the files and images needed in a secure manner. As a result, this distribution of information in manifest files can reduce the size of the installer.

Assemblies 610 can be installed in control plane namespace 506, and assemblies 612 can be installed in tethered namespaces 508 by computer 500. In this depicted example, base modules for required assemblies are used to install microservices 620 for assemblies 610 in control plane namespace 506 and some of modules can be used to install microservices 622 for assemblies 612 in tethered namespaces 508. Some of assemblies 612 in tethered namespaces 508 can be subassemblies referenced by assemblies 610 in control plane namespace 506.

In this illustrative example, modules can be used to install the microservices in an assembly in cluster 502. The assembly is then considered to be installed in cluster 502 and can now be used by a user.

In the depicted example, a microservice can have one or more containers in which each container runs an image from images 602. A group of containers for a microservice can be referred to as a pod in these examples with respect to the manner in which pods are used in Kubernetes. Kubernetes is a portable, extensible, open-source platform for managing containerized workloads and services.

With the use of tethered namespaces 508, multiple instances of an assembly can be installed in the set of tethered namespaces 508. Each tethered namespace can be included in an assembly shared by a group of users and, at the same time, isolated from other users using other instances of the assembly in other tethered namespaces. This isolation can provide a desired level of security in isolation between different groups of users working on different projects while allowing a group of users to access the common project being worked on by the group of users.

Further, with control plane namespace 506 and tethered namespaces 508, some microservices can be installed into control plane namespace 506 and other microservices can be installed into tethered namespaces 508. This type of installation can provide specific functionality and a namespace which allows for providing specific functionality and selected products to be used in isolated projects. In the illustrative example, some of the assemblies that support tethered namespaces are components of a larger assembly. From the perspective of the parent assembly in this example, only a part of functionality of the assembly is deployed and then isolated into a tethered namespace This approach promotes a much higher level of security and isolation for departmental work and groups of users working on specific projects promoting collaboration and needed isolation of projects. One or more instances of microservices can be present that save resources. Resource savings come from only instantiating microservices in tethered namespaces. Assemblies that support tethered namespaces can be used to support multiple instances of an assembly as well. Furthermore, some of the microservices from such an assembly can be designated to be singleton microservice and only deploy once in the control plane namespace. These modules can be used to deploy microservices for metering and load balancers. In one illustrative example, when an assembly is installed multiple times into multiple tethered namespaces, resources are saved as these singleton microservices are not duplicated. Additionally, since all these assemblies are now in difference namespaces, they are isolated and therefore more secured. The same set of images can be used so there is no need to download copies when instantiating an instance of an assembly in a tethered namespace.

Install in FIG. 5 and FIG. 6 can be performed even when cluster 502 does not have access to the Internet. This installation can be performed for cluster 502 in an air-gap mode when cluster 502 is fully isolated from the Internet. In this case, a bridge server, such as firewall bridge server 505, can download required data. Afterwards, firewall bridge server 505 can be isolated from the Internet and connect to a cluster node in cluster 502 to push the required data to one of the nodes to be used for installation and set up in cluster 502.

Figure 7:
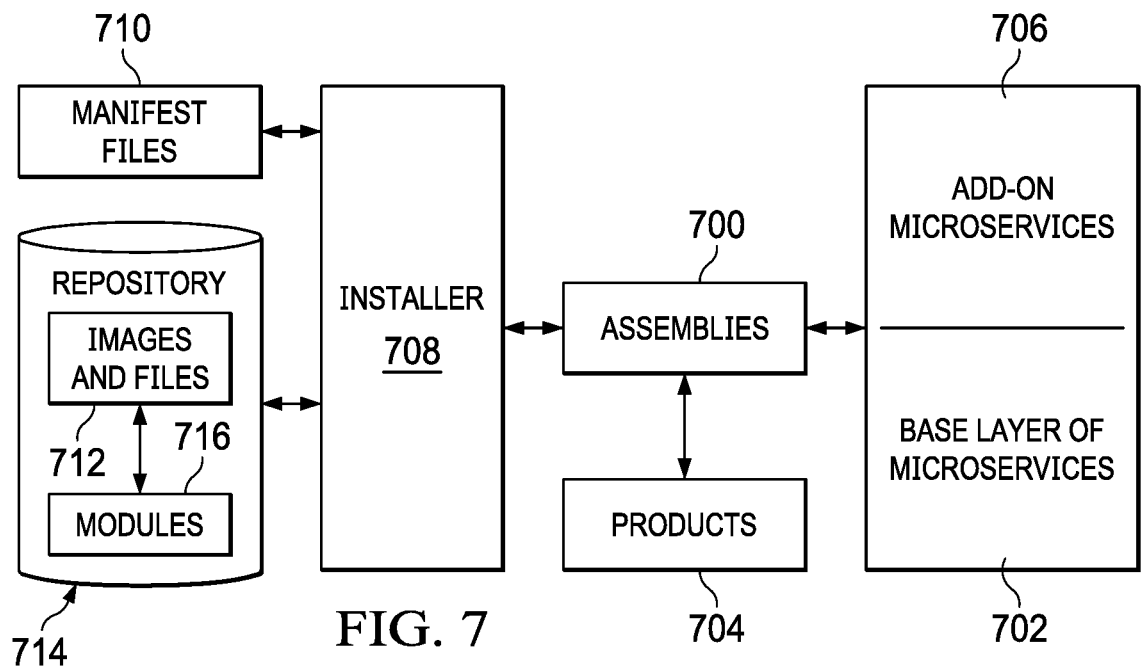
FIG. 7 is an illustration of microservice configurations in accordance with an illustrative embodiment.

With reference now to FIG. 7, an illustration of microservice configurations is depicted in accordance with an illustrative embodiment. In this illustrative example, assemblies 700 can have base layer of microservices 702. The microservices in base layer of microservices 702 can be a common set of microservices that are present for all of products 704. Add-on microservices 706 are additional microservices that can be selectively added on top of base layer of microservices 702 to provide different functionality and features for different products in products 704. Further, within the same product, different levels of functionality can be provided through this architecture based on user selections.

In this illustrative example, each product in products 704 can be installed by installer 708 using a manifest file in manifest files 710 for that product in products 704. In this manner, installer 708 can download images and files 712 in repository 714 specified by the particular manifest file for the product.

In the illustrative example, images and files 712 for microservices can be defined using modules 716. For example, a module in modules 716 can define particular images and files in images and files 712 that are needed for a particular microservice.

Repository 714 can be a storage system that is accessible by clients for installing products 704. For example, repository 714 can be accessible through a website or a web service on the Internet. In this manner, only particular images and files in images and files 712 needed for a particular product are downloaded. As a result, increased flexibility is present for customizing features and functions for products 704 through the use of manifest files 710 and images and files 712.

Figure 8:
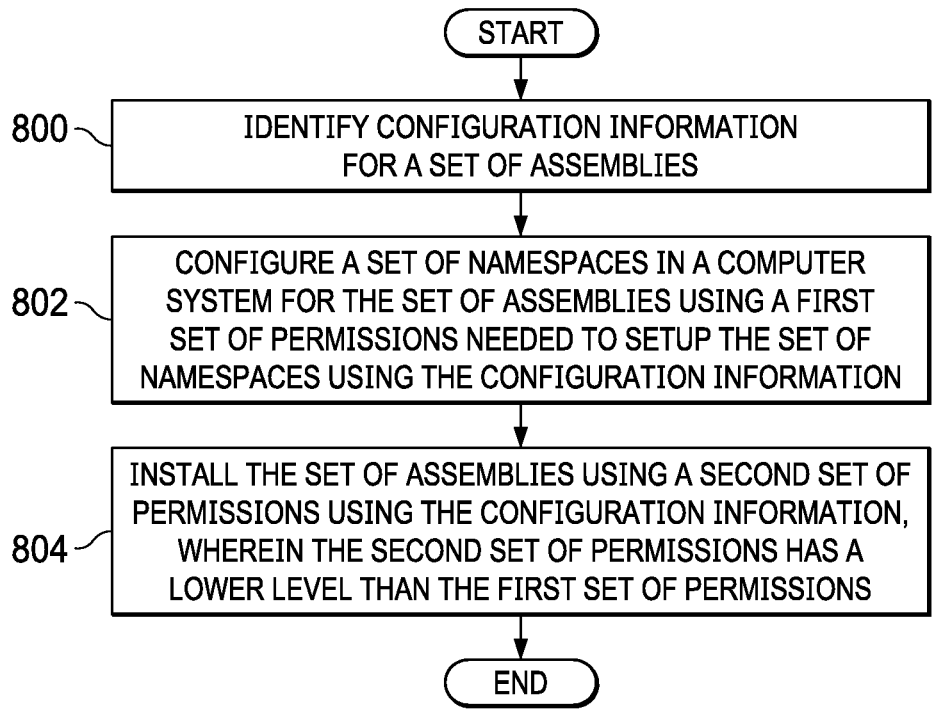
FIG. 8 is a flowchart of a process for managing microservices in accordance with an illustrative embodiment.

Turning next to FIG. 8, a flowchart of a process for managing microservices is depicted in accordance with an illustrative embodiment. The process in FIG. 8 can be implemented in hardware, software, or both. When implemented in software, the process can take the form of program code that is run by one or more processor units located in one or more hardware devices in one or more computer systems. The process can be implemented in a component such as microservices manager 418 in computer system 416 in FIG. 4.

The process begins by identifying configuration information for a set of assemblies (step 800). The process configures a set of namespaces in a computer system for the set of assemblies using a first set of permissions needed to set up the set of namespaces using the configuration information (step 802).

The process installs the set of assemblies using a second set of permissions using the configuration information, wherein the second set of permissions has a lower level than the first set of permissions (step 804). The process terminates thereafter.

Figure 9:
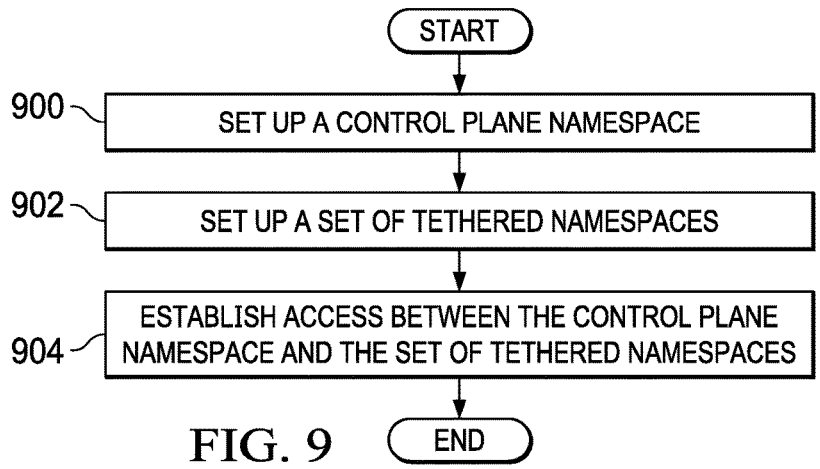
FIG. 9 is a flowchart of a process for configuring namespaces in accordance with an illustrative embodiment.

With reference to FIG. 9, a flowchart of a process for configuring namespaces is depicted in accordance with an illustrative embodiment. The process illustrated in FIG. 9 is an example of one implementation for step 802 in FIG. 8.

The process begins by setting up a control plane namespace (step 900). The process sets up a set of tethered namespaces (step 902).

The process establishes access between the control plane namespace and the set of tethered namespaces (step 904). The process terminates thereafter.

Figure 10:
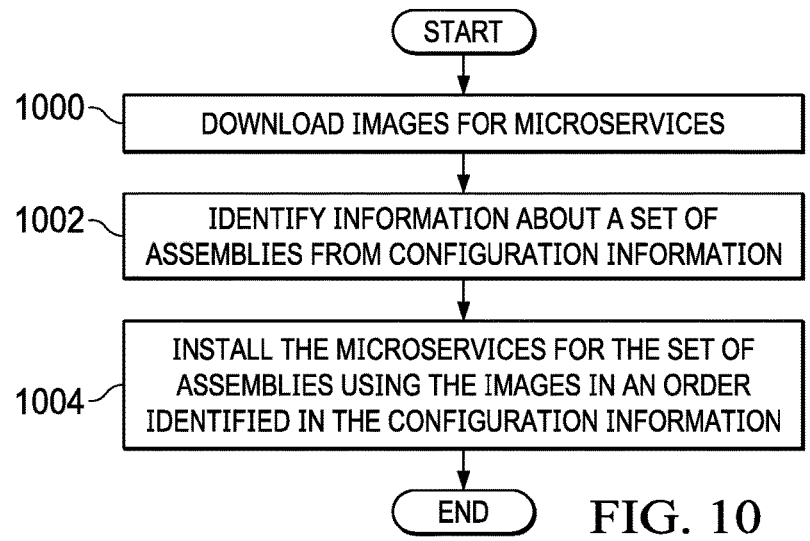
FIG. 10 is a flowchart of a process for installing microservices in accordance with an illustrative embodiment.

Turning next to FIG. 10, a flowchart of a process for installing microservices is depicted in accordance with an illustrative embodiment. The process illustrated in FIG. 10 is an example of one implementation for step 804 in FIG. 8.

The process begins by downloading images for microservices (step 1000). The process identifies information about a set of assemblies from configuration information (step 1002).

The process installs the microservices for the set of assemblies using the images in an order identified in the configuration information (step 1004). The process terminates thereafter.

Figure 11:
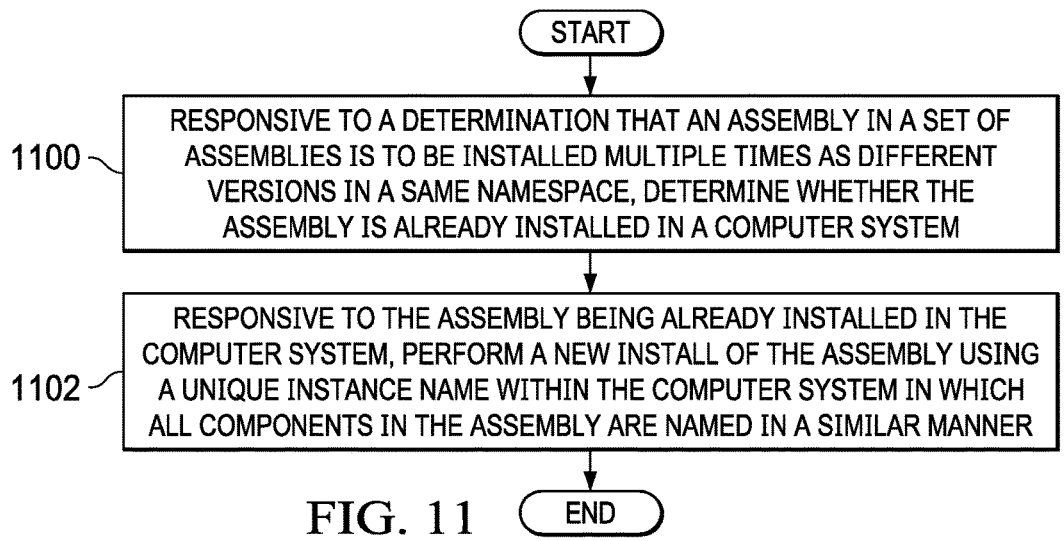
FIG. 11 is a flowchart of a process for managing microservices in accordance with an illustrative embodiment.

Turning next to FIG. 11, a flowchart of a process for managing microservices is depicted in accordance with an illustrative embodiment. The steps in this figure are an example of additional steps that can be performed in the process for managing microservices in FIG. 8.

Responsive to a determination that an assembly in a set of assemblies is to be installed multiple times as different versions in a same namespace, the process determines whether the assembly is already installed in a computer system (step 1100).

The process, responsive to the assembly being already installed in the computer system, performs a new install of the assembly using a unique instance name within the computer system in which all components in the assembly are named in a similar manner (step 1102). The process terminates thereafter.

Figure 12:
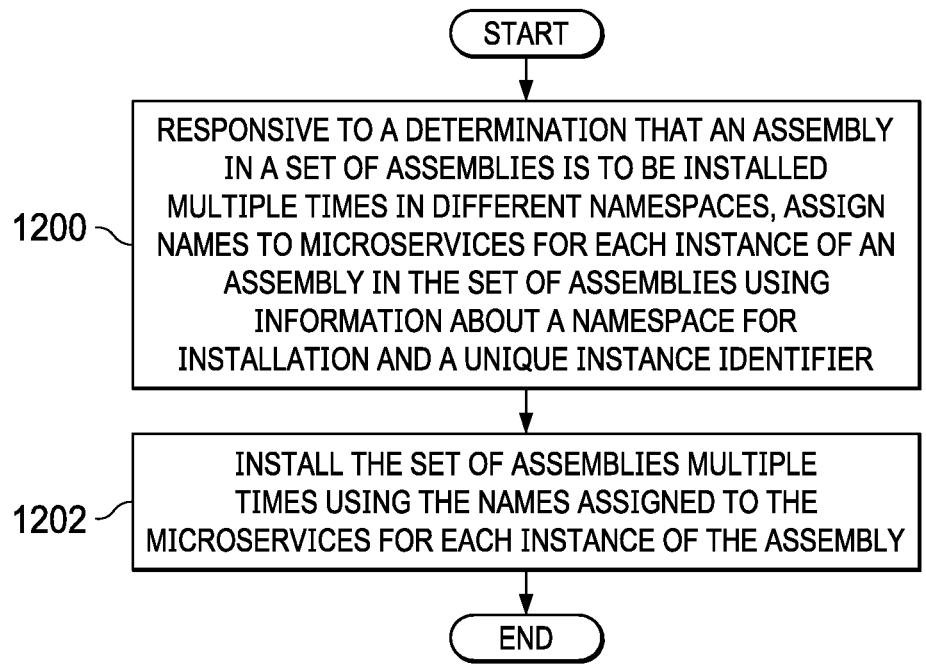
FIG. 12 is a flowchart of a process for managing microservices in accordance with an illustrative embodiment.

In FIG. 12, a flowchart of a process for managing microservices is depicted in accordance with an illustrative embodiment. The steps in this figure are an example of additional steps that can be performed in the process for managing microservices in FIG. 8.

Responsive to a determination that an assembly in a set of assemblies is to be installed multiple times in different namespaces, the process assigns names to microservices for each instance of an assembly in the set of assemblies using information about a namespace for installation and a unique instance identifier (step 1200). The process installs the set of assemblies multiple times using the names assigned to the microservices for each instance of the assembly (step 1202). The process terminates thereafter.

Figure 13:
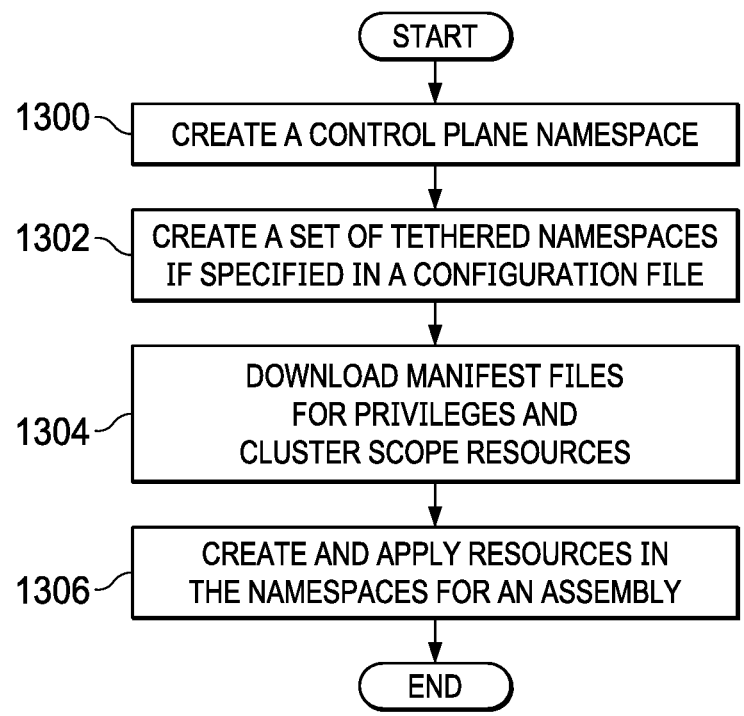
FIG. 13 is a flowchart of a process for configuring an environment in a cluster in accordance with an illustrative embodiment.

With reference to FIG. 13, a flowchart of a process for configuring an environment in a cluster is depicted in accordance with an illustrative embodiment. The process in FIG. 8 can be implemented in hardware, software, or both. When implemented in software, the process can take the form of program code that is run by one or more processor units located in one or more hardware devices in one or more computer systems. The process can be implemented in a component such as microservice manager 418 in computer system 416 in FIG. 4.

In this example, microservice manager 418 can include an install binary or script that runs to perform various steps in configuring the environment in the cluster. The installer binary can be written in various languages such as GO, C, C++, or some other suitable language. A script can be written in various languages such as Python, JavaScript, Java, or other suitable languages.

The installation can be performed accessing configuration information in a configuration file. This configuration file can also be referred to as a manifest file. In one illustrative example, the configuration file can be in various formats such as YAML Ain't Markup Language (YAML), JavaScript Object Notation (JSON), or some other suitable format.

The privilege level used for setting up the environment in the cluster is a cluster-admin privilege. In other words, the configuring of the environment in the cluster is performed by the process as a cluster admin. This type of privilege provides access to all of the resources in the cluster and is a highest level of privilege in this example.

The process begins by creating a control plane namespace (step 1300). The process then creates a set of tethered namespaces if specified in a configuration file (step 1302). Step 1302 is an optional step that is selectively performed depending on whether the set of tethered namespaces are specified in the configuration file.

The process downloads manifest files for privileges and cluster scope resources (step 1304). These manifest files describe the privileges and cluster scope resources in a language understood by the cluster. The language can be, for example, YAML, which is a human-readable data-serialization language. YAML can be used for configuration files and in applications where data is being stored or transmitted. In this example, the process identifies the privileges and cluster scope resources from the configuration file. The privileges and cluster scope resources can include, for example, a security context container (SCC), a cluster role database (CRD), a role, a cluster role, and other information needed to set up the namespaces in the cluster.

The process then creates and applies resources in the namespaces for the assembly (step 1306). The process terminates thereafter. In step 1306, resources such as storage, memory, processing resources, and other resources are requested and assigned to the namespace. When one or more tethered namespaces are present in addition to a control plane namespace, the step also includes setting up in turn namespace privileges and roles to ensure proper access for common microservices between the control plane namespace and the tethered namespaces. This access enables the control plane namespace to manage the set of tethered namespaces.

Figure 14:
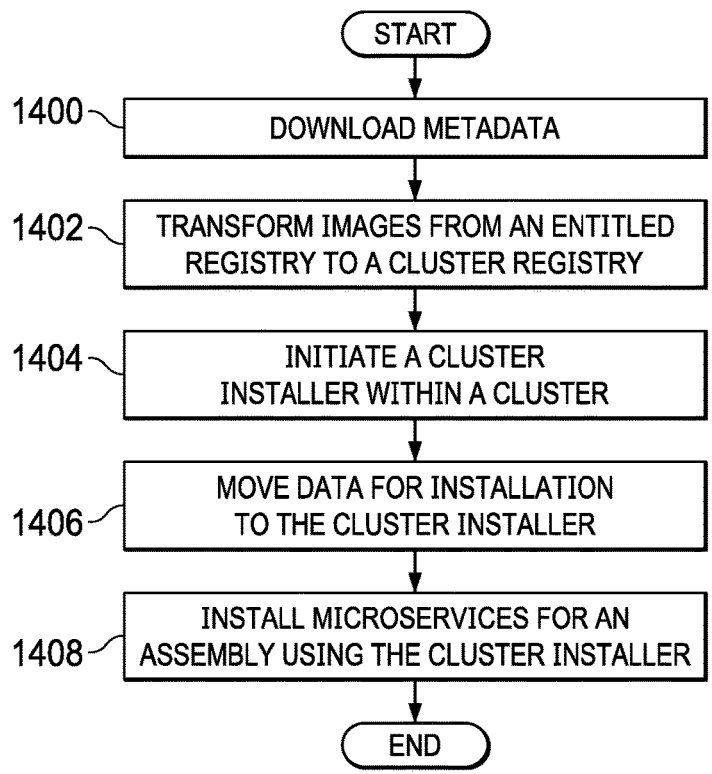
FIG. 14 is a flowchart of a process for installing microservices for an assembly in accordance with an illustrative embodiment.

Turning next to FIG. 14, a flowchart of a process for installing microservices for an assembly is depicted in accordance with an illustrative embodiment. The process in FIG. 14 can be implemented in hardware, software, or both. When implemented in software, the process can take the form of program code that is run by one or more processor units located in one or more hardware devices in one or more computer systems. The process can be implemented in a component such as microservice manager 418 in computer system 416 in FIG. 4. In this figure, the process illustrates additional steps that can be performed by a binary prescript in microservice manager 418. These steps are performed after the steps in the process performed in FIG. 13 to set up the environment in the cluster.

The process begins by downloading metadata (step 1400). In this example, the metadata can be identified from a configuration file that includes information about an assembly and microservices or any other assemblies that may be in the assembly. In this example, the metadata can identify what images and files are needed for the assembly. Each microservice in the assembly may have one or more images. Additionally, the files identified by the metadata can include rules on how the containers will run the images and how the containers with the images are grouped. For example, the rules define what image each container should use; what command each container needs to run; how the containers are grouped (i.e. forming a pod/deployment/stateful set/ replica set); storage requests (i.e. the number of volumes needed, size and access mode of each volume); health and readiness checks; as well as other items needed to install and run the microservices.

The process transforms images from an entitled registry to a cluster registry (step 1402). In this illustrative example, the registries are databases. The entitled registry is located at a source such as a service provider. The cluster registry is a local storage in the cluster. By transferring these images, less access and bandwidth is needed when additional or future installations are needed using the same images.

The process initiates a cluster installer within a cluster (step 1404). In this illustrative example, the installer can be an installer pod, such as a Helm tiller pod. The cluster installer can be selected from any mechanism that can install the microservices for the assemblies within the cluster. The cluster installer is a separate process from the binary or script installer used to set up the environment. This installer can receive requests from the binary or script installer to perform actions within the cluster such as installing microservices using the images in the cluster registry.

The process moves data for installation to the cluster installer (step 1406). In step 1406, movement of the data to the cluster installer is the movement of the data to a location at which the cluster installer looks to perform the installation of the microservices. This data can be, for example, images, rules, manifest files, or other information that the cluster installer may need.

The process then installs microservices for an assembly using the cluster installer (step 1408). The process terminates thereafter. In this example, the microservices are installed using the images downloaded to the cluster in the cluster registry.

Figure 15:
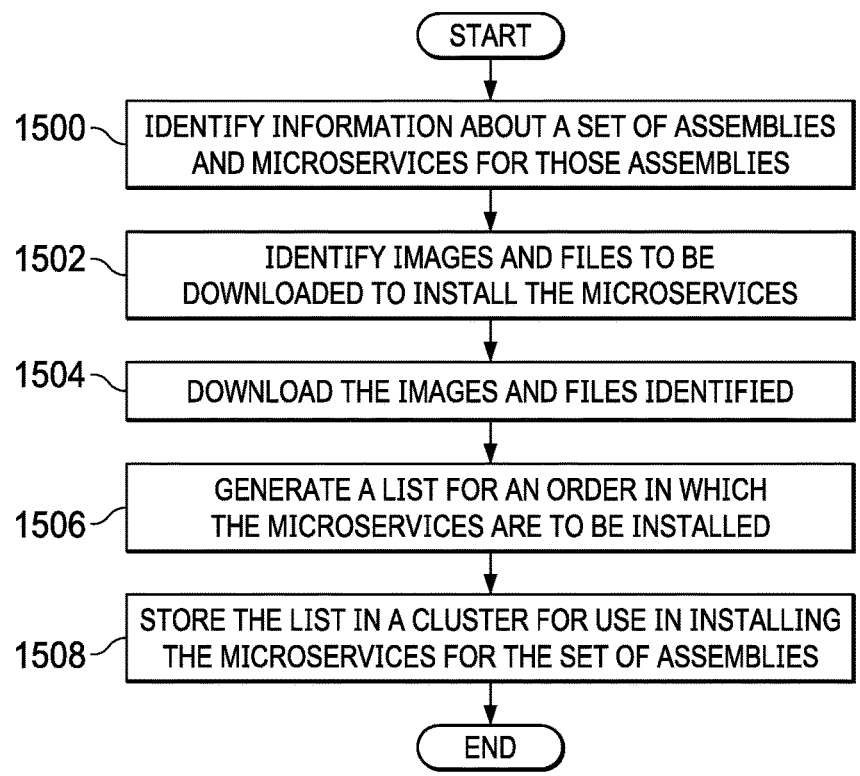
FIG. 15 is a flowchart of a process for downloading microservices for installation in accordance with an illustrative embodiment.

Turning next to FIG. 15, a flowchart of a process for downloading microservices for installation is depicted in accordance with an illustrative embodiment. The process in FIG. 15 can be implemented in hardware, software, or both. When implemented in software, the process can take the form of program code that is run by one or more processor units located in one or more hardware devices in one or more computer systems. The process can be implemented in a component such as microservice manager 418 in computer system 416 in FIG. 4. In this figure, the process illustrates additional steps that can be performed by a binary prescript in microservice manager 418. These steps are performed after steps in the process performed in FIG. 13 to set up the environment in the cluster.

The process begins by identifying information about a set of assemblies and microservices for those assemblies (step 1500). The process identifies images and files to be downloaded to install the microservices (step 1502). The process downloads the images and files identified (step 1504). In this manner, only the images and files needed to install the microservices in one or more assemblies are downloaded.

The process generates a list for an order in which the microservices are to be installed (step 1506). In step 1506, the order of installation can be determined using the following steps: (1) a request is received for an assembly install or upgrade; (2) the installer downloads, reads, and parses the assembly's manifest file, which has a list of required components (could be a set of microservices or an assembly) in the correct install order; (3) if a component is an assembly, the installer recursively determines its microservices and an order for install with the result being put in the assembly; or (4) when all microservices and assemblies are processed, the install order for the list is determined.

The process stores the list in a cluster for use in installing the microservices for the set of assemblies (step 1506). The process terminates thereafter. The list in step 1506 can also be used for uninstalling an assembly. This list also can be used to upgrade a microservice. For example, the microservices can be uninstalled in the correct order up through the microservice to be upgraded. After the microservice is upgraded, the list can then be used to reinstall the uninstalled microservices. This installation can be performed using a local copy of the images in a registry or storage within the cluster, reducing the amount of data that needs to be downloaded for upgrades.

Thus, the processes in the different flowcharts install assemblies in namespaces in a manner with increased security through using multilevel privileges. Further, the customization of installs can be made easier as compared to current techniques. With the different processes, a single archive file is not created for a particular assembly. Instead, a configuration file is created for an assembly. This configuration file defines the images and files needed for a particular assembly. As a result, if a user desires a customization or change to an assembly or a number of assemblies, changes are made to the configuration file. The images for any assemblies offered can be stored in a storage system that can be downloaded as needed for a particular configuration. In this manner, increased customization can be provided to users with less effort and cost as compared to current techniques. In this manner, the users can choose which assemblies should be installed and whether multiple instances of an assembly should be installed in multiple namespaces.

Downloading of archives can take large amounts of time due to size of the archives currently used to install microservices. When multiple instances of an assembly are to be installed on multiple namespaces, images, files, and other information for the assembly is downloaded once locally to the cluster. Each time instances are to be installed, that installation can be performed with local copies of the images, files, and other information. In this manner, installations of different instances do not require downloading the files each time the instances are installed. Further, these installations do not require customized tarballs to support these instances in different namespaces.

Further, through the use of different levels of privileges for different phases of insulation, increased security can be enabled. A higher level of privilege, such as a cluster admin, is used to configure the environment in the cluster. When other steps such as installing the microservices are performed, a lower level of privilege such as a project can be used.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware. For example, the processes depicted in the figures can be run by a number of processors.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 16:
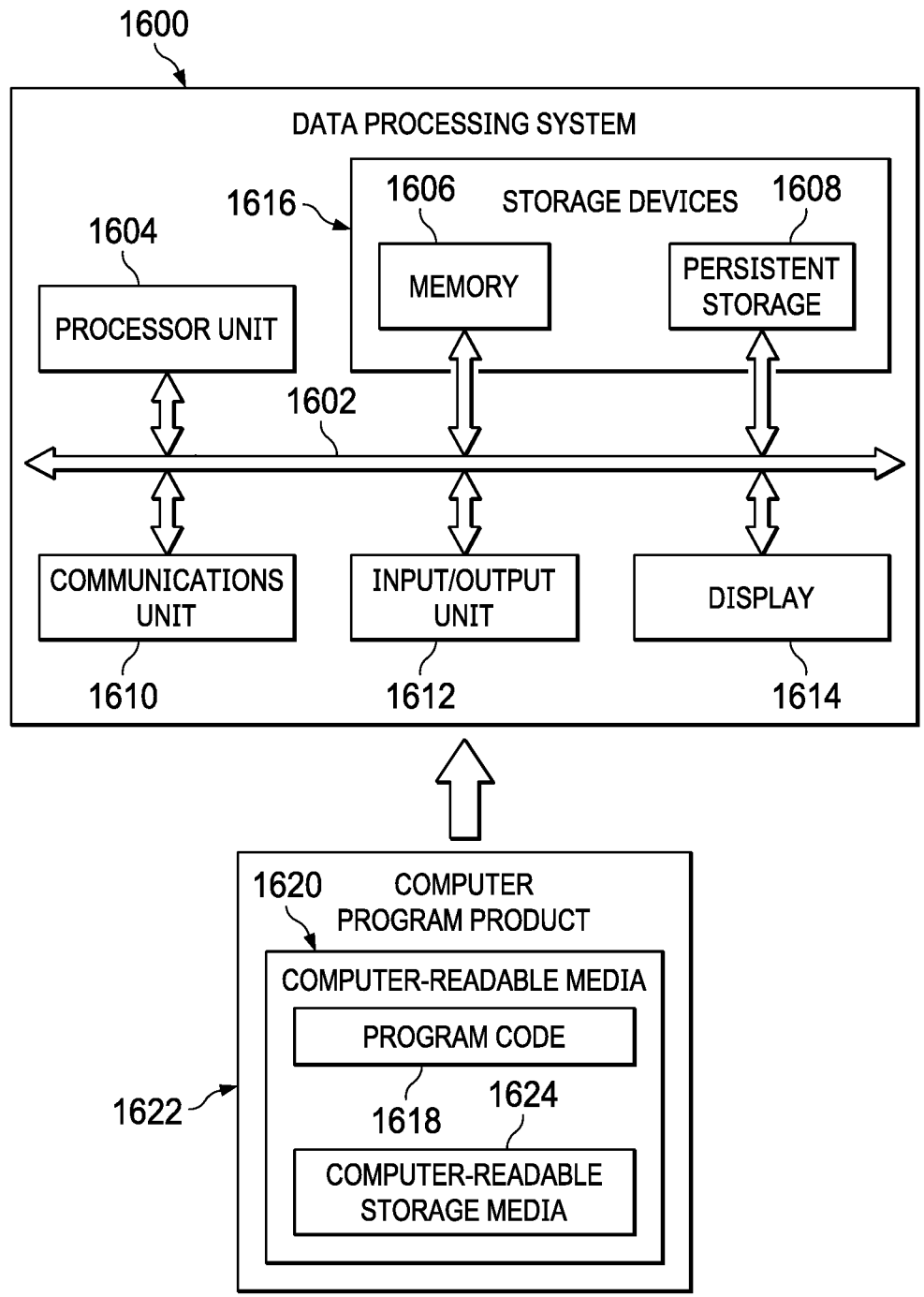
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement server computer 304, server computer 306, client devices 310, and cluster 334 in FIG. 3. Data processing system 1600 can also be used to implement computer system 416 and cluster 410 in FIG. 4. Data processing system 1600 can also be used to implement computer 500 and cluster 502 in FIG. 5 and FIG. 6. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program code, computer usable program code, or computer-readable program code that can be read and executed by a processor in processor unit 1604. The program code in the different embodiments can be embodied on different physical or computer-readable storage media, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable media 1620 is computer-readable storage media 1624.

In these illustrative examples, computer-readable storage media 1624 is a physical or tangible storage device used to store program code 1618 rather than a medium that propagates or transmits program code 1618. Computer readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1618 can be transferred to data processing system 1600 using a computer-readable signal media. The computer-readable signal media are signals and can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program code 1618 can be located in computer-readable media 1620 in the form of a single storage device or system. In another example, program code 1618 can be located in computer-readable media 1620 that is distributed in multiple data processing systems. In other words, some instructions in program code 1618 can be located in one data processing system while other instructions in program code 1618 can be located in one data processing system. For example, a portion of program code 1618 can be located in computer-readable media 1620 in a server computer while another portion of program code 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in, or otherwise, form a portion of another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program code 1618.

Thus, the illustrative embodiments provide a computer-implemented method, computer system, and computer program product for managing microservices. In one illustrative example, a method manages microservices. A number of processors identifies configuration information for a set of assemblies. The number of processors configures a set of namespaces in a computer system for the set of assemblies using a first set of permissions needed to set up the set of namespaces using the configuration information. The number of processors installs the set of assemblies using a second set of permissions using the configuration information. The second set of permissions has a lower level than the first set of permissions.

Examples of features in the illustrative examples include a computer-implemented process that manages interdependent microservices using multiple instances in tethered namespaces. The interdependent microservices can be microservices for an assembly in which the microservices can interact with each other in performing functions within the assembly.

Prior to beginning the installation process, a first set of instructions for an installer can be received in which the first set of instructions for this installer can be, for example, an install binary or a script. The install binary or script has been pre-created for installation and assembly. The assembly can be installed with various options that may be selected through user input during or prior to execution for a set of instructions. Further, a configuration file can be generated. The configuration file can include credentials, an entitled registry application programming interface key, and a metadata universal resource locator used by a cluster admin to download required assemblies and modules hosted on a fileserver.

A second set of instructions can be run to perform an admin set up in which the environment for the assembly with the microservices is configured. In this admin set up, a control plane namespace is created. Additionally, a set of tethered namespaces can be optionally created if specified.

A set of privileges and cluster scoped resources can be downloaded. The resources can be created or applied in a control plane namespace and respective tethered namespaces considering inter namespace privileges and roles enabling proper accesses for common microservices between the control plane and tethered namespaces of the set of tethered namespaces.

The microservices can be installed using the first set of instructions, supporting overrides on at least one of a module (microservice) level, an assembly (product) level, and a global level by downloading predetermined metadata; transferring images from an entitled registry to a cluster registry; extracting information about assemblies and relevant modules from respective manifest files; compiling a list of only microservices needed to be downloaded and installed in a predefined order; storing the predefined order in a cluster; and installing base modules for predetermined assemblies.

In response to a determination to install an assembly multiple times under a same namespace and using different versions as indicated in a definition file of a respective assembly, a determination is made as to whether the assembly to be installed is already installed in a cluster. In response to the determination that the assembly to be installed is already installed in the cluster, a unique instance name to differentiate a new install is defined. In response to receiving the unique instance name, the unique instance name is used by the installer for the new install, including naming all of the components of the assembly in a similar manner. Information about the new install is saved. This information can include the unique instance name and naming all of the components of the assembly.

Further, in response to a determination to install an assembly multiple times under different namespaces, the microservices and the assemblies are named using information about a respective tethered namespace and the unique instance. The information about the respective tethered namespace and the unique instance are saved.

Thus, one or more illustrative examples can increase the flexibility of the installation process as compared to current techniques. In the illustrative example, the deployment of multiple instances of a product can be placed into one or more tethered namespaces, thus allowing multiple instances of the product to be installed. This installation can be performed for different groups or departments within an organization that use the same product. In this manner, multiple projects can be supported using the multiple instances of the same product. Additionally, isolation of microservices in the tethered namespaces can be made to achieve enterprise-level collaboration for multiple teams and departments.

Additionally, one or more illustrative examples can provide enhanced security during installation of an assembly for a product. For example, a user and cluster for administrator privileges can be implemented in a manner that reduces the use of elevated or higher-level permissions to a minimum as needed for particular portions of the installation.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing microservices, the method comprising:
   identifying, by a number of processors, configuration information for a set of assemblies;
   configuring, by the number of processors, a set of namespaces in a computer system for the set of assemblies using a first set of permissions needed to set up the set of namespaces using the configuration information;
   creating, by the number of processors, the set of namespaces for the set of assemblies using the first set of permissions needed to set up the set of namespaces by an installer downloaded from a client computer via a network;
   setting up, by the number of processors, a control plane namespace;
   setting up, by the number of processors, a set of tethered namespaces;
   establishing, by the number of processors, access between the control plane namespace and the set of tethered namespaces; and
   subsequent to the establishing, installing, by the number of processors, the set of assemblies using a second set of permissions using the configuration information.

2. The method of claim 1, wherein installing, by the number of processors, the set of assemblies using the second set of permissions using the configuration information, wherein the second set of permissions has the lower level than the first set of permissions comprises:
   downloading, by the number of processors, images for the microservices;
   identifying, by the number of processors, information about the set of assemblies from the configuration information; and
   installing, by the number of processors, the microservices for the set of assemblies using the images in an order identified in the configuration information.

3. The method of claim 2 further comprising:
   responsive to a determination that an assembly in the set of assemblies is to be installed multiple times as different versions in a same namespace, determining, by the number of processors, whether the assembly is already installed in the computer system; and
   responsive to the assembly being already installed in the computer system, performing, by the number of processors, a new install of the assembly using a unique instance name within the computer system in which all components in the assembly are named in a similar manner.

4. The method of claim 2 further comprising:
   responsive to a determination that the assembly in the set of assemblies is to be installed multiple times in different namespaces, assigning, by the number of processors, names to the microservices for each instance of the assembly in the set of assemblies using the information about a namespace for installation and a unique instance identifier; and
   installing the set of assemblies multiple times using the names assigned to the microservices for each instance of the assembly.

5. The method of claim 1, wherein the configuration information comprises at least one of a credential for downloading files and images, an entitled registry application programming interface key, or a metadata universal resource locator used to download data for assemblies.

6. The method of claim 1, wherein the configuration information is stored in a manifest file associated with a given assembly of the set of assemblies and lists given microservices of the microservices that are provided by the given assembly and any sub-assemblies that form the given assembly.

7. The method of claim 6, wherein the computer system is a cluster, and the microservices each have a corresponding microservice manifest file that includes a list of images and deployment rule files for the each microservice.

8. A microservice management system comprising:
   a computer system, wherein the computer system identifies configuration information for a set of assemblies;
   configures a set of namespaces in the computer system for the set of assemblies using a first set of permissions needed to set up the set of namespaces using the configuration information;
   creates the set of namespaces for the set of assemblies using the first set of permissions needed to set up the set of namespaces by an installer downloaded from a client computer via a network;
   sets up a control plane namespace;
   sets up a set of tethered namespaces; and
   establishes access between the control plane namespace and the set of tethered namespaces; and
   installs, based on the established access, the set of assemblies using a second set of permissions using the configuration information, wherein the second set of permissions has a lower level than the first set of permissions.

9. The microservice management system of claim 8, wherein in installing the set of assemblies using the second set of permissions using the configuration information, the computer system downloads images for microservices; identifies information for the set of assemblies from the configuration information; and installs the microservices of the set of assemblies using images in an order identified in the configuration information.

10. The microservice management system of claim 9, wherein the computer system, responsive to a determination that an assembly in the set of assemblies is to be installed multiple times as different versions in a same namespace, determines whether the assembly is already installed in the computer system and, responsive to the assembly being already installed in the computer system, performs a new install of the assembly using a unique instance name within the computer system in which all components in the assembly are named in a similar manner.

11. The microservice management system of claim 9, wherein the computer system, responsive to a determination that the assembly in the set of assemblies is to be installed multiple times in different namespaces, assigns names to the microservices for each instance of the assembly in the set of assemblies using the information about a namespace for installation and a unique instance identifier and installs the set of assemblies multiple times using the names assigned to the microservices for each instance of the assembly.

12. The microservice management system of claim 8, wherein the configuration information comprises at least one of a credential for downloading files and images, an entitled registry application programming interface key, or a metadata universal resource locator used to download data for assemblies.

13. The microservice management system of claim 8, wherein the configuration information is stored in a manifest file associated with a given assembly of the set of assemblies and lists given microservices of the microservices that are provided by the given assembly and any sub-assemblies that form the given assembly, and the microservices each have a corresponding microservice manifest file that includes a list of images and deployment rule files for the each microservice.

14. A method for managing microservices, the method comprising:
   identifying, by a number of processors, configuration information for a set of assemblies;
   configuring, by the number of processors, a set of namespaces in a computer system for the set of assemblies using a first set of permissions needed to set up the set of namespaces using the configuration information;
   creating, by the number of processors, the set of namespaces for the set of assemblies using the first set of permissions needed to set up the set of namespaces by an installer downloaded from a client computer via a network;
   installing, by the number of processors, the set of assemblies using a second set of permissions using the configuration information, wherein the second set of permissions has a lower level than the first set of permissions; and
   downloading, by the number of processors, images for the microservices;
   identifying, by the number of processors, information about the set of assemblies from the configuration information; and
   installing, by the number of processors, the microservices for the set of assemblies using the downloaded images in an order specified in the configuration information.

* * * * *